United States Patent [19]

Freeman

[11] Patent Number: 4,541,704
[45] Date of Patent: Sep. 17, 1985

[54] PHOTOGRAPHIC CAMERA WITH ELECTRONIC IMAGE ENHANCEMENT

[75] Inventor: William T. Freeman, Cambridge, Mass.

[73] Assignee: Polaroid Corporation, Cambridge, Mass.

[21] Appl. No.: 648,773

[22] Filed: Sep. 10, 1984

[51] Int. Cl.⁴ .............................................. G03B 7/28
[52] U.S. Cl. .................................... 354/432; 354/202
[58] Field of Search ......... 354/410, 413, 126, 202 FF, 354/432, 429, 354; 355/70, 80

[56] References Cited

U.S. PATENT DOCUMENTS

| | | | |
|---|---|---|---|
| 3,116,670 | 1/1964 | Ball | 354/476 |
| 3,415,644 | 12/1968 | Land | 96/3 |
| 3,594,165 | 7/1971 | Rogers | 96/3 |
| 3,761,268 | 9/1973 | Land et al. | 96/76 C |
| 3,823,413 | 7/1974 | Cole | 354/202 FF |
| 3,872,487 | 3/1975 | Gold | 354/86 |
| 3,926,520 | 12/1975 | Kaufman | 355/80 |
| 4,057,815 | 11/1977 | Johnson | 354/288 |
| 4,106,034 | 8/1978 | Mills | 354/432 |
| 4,162,831 | 7/1979 | Gold | 354/432 |
| 4,218,119 | 8/1980 | Schickedanz | 354/432 |
| 4,249,815 | 2/1981 | Burkholder | 354/202 FF |
| 4,268,146 | 5/1981 | Johnson | 354/145 |
| 4,384,336 | 5/1983 | Frankle et al. | 382/49 |
| 4,473,288 | 9/1984 | Onodera et al. | 354/432 |

FOREIGN PATENT DOCUMENTS 0097032 12/1983 European Pat. Off. .
2104266 3/1983 United Kingdom .

Primary Examiner—Russell E. Adams
Attorney, Agent, or Firm—Edward S. Roman

[57] ABSTRACT

A photographic camera apparatus with electronic image enhancement operates to control the exposure of a photosensitive material to scene light received directly from a scene to be photographed in a manner whereby the photosensitive material is exposed to an extent less than a selected optimum exposure value and the scene light is simultaneously electronically sensed to provide electrical signal information corresponding thereto to control an additional electronic exposure of the photosensitive material so that in conjunction with the direct exposure to scene light there is substantially provided the selected optimum exposure value.

10 Claims, 4 Drawing Figures

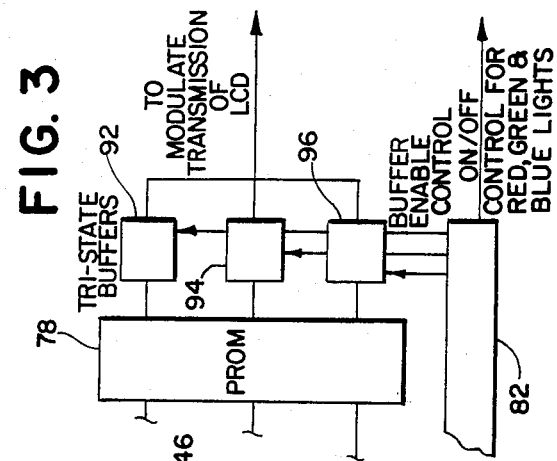
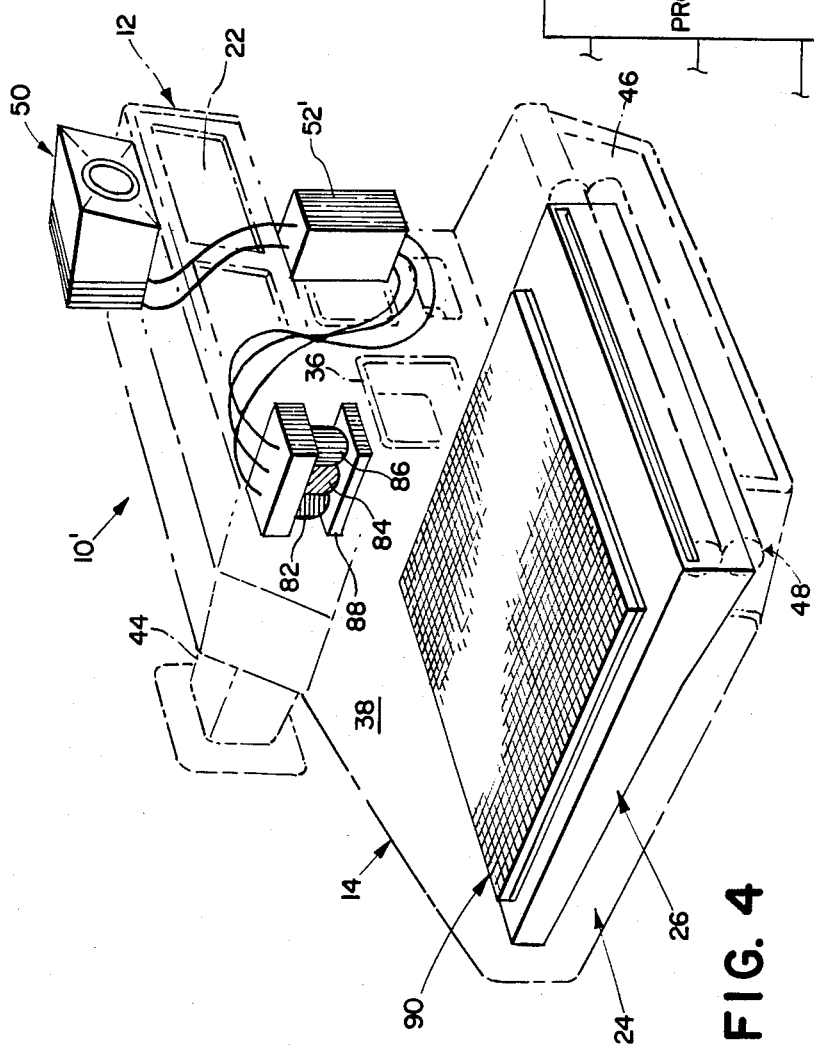

PHOTOGRAPHIC CAMERA WITH ELECTRONIC IMAGE ENHANCEMENT

BACKGROUND OF THE INVENTION

1. Field of the Invention

This invention relates generally to a photographic camera apparatus with electronic image enhancement and, more particularly, to a photographic camera apparatus in which a photosensitive material is both optically exposed to image scene light and electronically exposed to electronically sensed image scene light.

2. Description of the Prior Art

Photographic cameras which operate to optically expose a photosensitive material to image scene light are very well established in the art. Such cameras may embody elaborate exposure control systems for precisely controlling the time of exposure as well as the size of the exposing aperture in accordance with the intensity of the light detected from the scene to be photographed. However, despite advances in the state of the art made with respect to exposure control systems, there still exists situations in which unfavorable or difficult scene lighting conditions as well as limitations in film sensitivity characteristics can contribute to a less than favorable exposure.

The so-called electronic imaging cameras such as that disclosed in U.S. Pat. No. 4,384,336 entitled "Method and Apparatus for Lightness Imaging", by Jonathan A. Frankle et al., issued May 17, 1983 in common assignment herewith and now incorporated by reference herein, can operate to electronically detect image data and manipulate electronic signal information in a manner so as to compensate for such unfavorable or difficult scene lighting conditions in the hard copy print provided thereby. Such electronic imaging cameras in some respects represent a substantial advance in the state of the art as a result of their ability to provide some degree of image enhancement or compensation; however, such cameras have yet to achieve the high degree of image resolution provided by the aforementioned conventional photographic camera apparatus.

Therefore, it is a primary object of this invention to provide a photographic camera apparatus with electronic image enhancement so as to provide high quality high resolution photographic prints that have been simultaneously electronically enhanced to compensate either for difficult or unfavorable scene lighting conditions as well as limitations in the film characteristics.

Other objects of the invention will be in part obvious and will in part appear hereinafter. The invention accordingly comprises a mechanism and system possessing the construction, combination of elements and arrangement of parts which are exemplified in the following detailed disclosure.

SUMMARY OF THE INVENTION

A photographic camera apparatus having electronic image enhancement comprises a means for controlling the exposure of a photosensitive material to scene light received directly from a scene of which an image is to be recorded in a manner whereby the photosensitive material is exposed to an extent less than a selected optimum exposure value. Means are also provided for sensing the scene light from the scene to be photographed during the photographic exposure and converting the sensed scene light to electrical signal information corresponding to the sensed scene light. Means respond to the electrical signal information to expose the photosensitive material to an extent which in conjunction with the direct exposure to scene light substantially provides the selected optimum exposure value. The scene light sensing means preferably senses the scene light at a resolution substantially less than the resolution at which the photosensitive material is exposed during its direct exposure to scene light. The exposing means responds to the electrical signal information and generally comprises means for processing and thereby altering the electrical signal information so as to ultimately enhance the recorded image of the scene.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

FIG. 3 is a schematic diagram for an alternate embodiment showing a portion of the electronic image enhancing feature of this invention; and FIG. 4 is a perspective view partly in phantom of an alternate embodiment for a photographic camera apparatus embodying the electronic image enhancing feature of this invention.

DESCRIPTION OF THE PREFERRED EMBODIMENT

Figure 1:
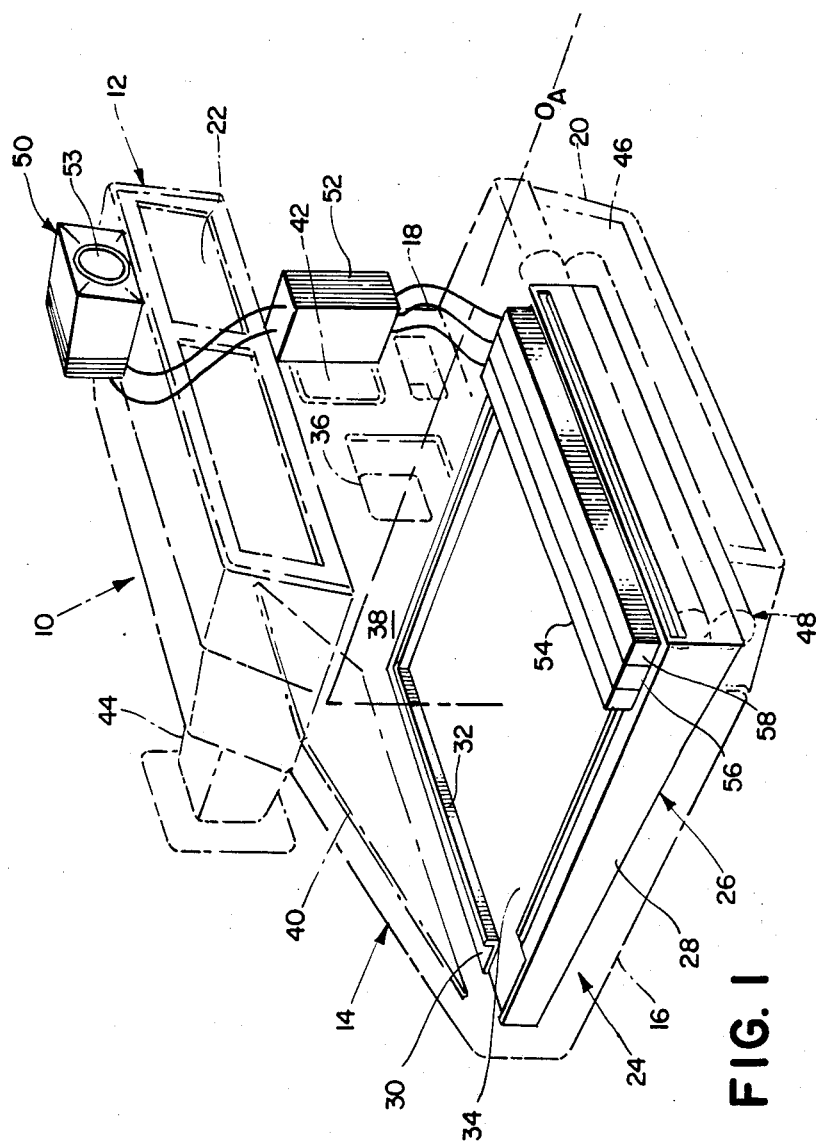
FIG. 1 is a perspective view partly in phantom of a photographic camera apparatus embodying the electronic image enhancing feature of this invention.

Referring now to FIG. 1 there is shown generally at 10 the photographic camera apparatus of this invention including an electronic flash unit 12 which may be of the quench type mounted on a rigid body 14 for movement between an erect operative position as shown and a folded inoperative position which is not illustrated. The rigid camera body 14 includes a generally prismatic shaped major housing 16, a generally L-shaped front housing 18, and a generally rectangularly shaped film loading door 20 which collectively define its outward appearance and serve to house and protect its interior components. The film loading door includes an elongated film exit slot 46 extending the length thereof for reasons which will become apparent from the following discussion. The aforementioned housings 16 and 18 and the film loading door 20 are all preferably molded of an opaque plastic to preclude unwanted light from entering the camera interior.

The flash unit 12 includes a source of illumination having an output window as shown at 22 arranged so that the light output from the flash is directed outwardly toward the scene in a well-known manner. For a more detailed description of the flash unit folding arrangement, reference may be had to U.S. Pat. No. 4,268,146 entitled "Camera with Folding Flash Unit", by Bruce K. Johnson, issued in common assignment herewith and now incorporated by reference herein.

Formed in the base of the prismatic housing 16 is a well-known film cassette receiving chamber generally designated at 24. The chamber 24 is adapted to releasably hold a film cassette such as that shown at 26. The film cassette 26 comprises a generally rectangular parallelepiped housing 28 which has an upwardly facing wall 30 carrying a generally rectangular aperture 32 therein. Mounted in registration with and biased towards the aperture 32 is a stacked array of integral type self-processable film units the top one of which is shown at 34. Each of the film units has a given film speed requiring a predetermined exposure which is provided by the camera in the manner of this invention. Underneath the stacked array of film units is a flat thin battery (not shown) which is electrically coupled in a well-known manner to power the various electrical systems of the camera apparatus 10. Examples of the film cassette are described in considerable detail in U.S. Pat. No. 3,872,487 entitled "Photographic Film Assemblage and Apparatus", by Nicholas Gold, issued Mar. 18, 1975 and in such other patents as U.S. Pat. Nos. 3,415,644, 3,594,165 and 3,761,268, all of which are now incorporated by reference herein.

In the front of the prismatic shaped major housing 16 there is provided an objective taking lens 36 through which the optical axis of the camera extends as shown by the phantom line $O_A$. The generally prismatic shaped major housing 16 includes an exposure chamber 38 inside thereof within which a trapezoidal shaped mirror 40 is arranged at a predetermined angle with respect to the optical axis $O_A$ in the film plane to provide a folded light path of predetermined length therebetween on which image forming scene rays from the objective taking lens 36 travel to the top film unit 34 in the film cassette 26. The exposure chamber 38 may be of the type which is described in considerable detail in U.S. Pat. No. 4,057,815, entitled "Anti-Flare Structure for Photographic Optical System", issued to Bruce K. Johnson on Nov. 8, 1977 in common assignment herewith and now incorporated by reference herein.

The generally prismatic shaped major housing 16 further includes a negative lens 42 in the front face thereof as part of a reversed Galilean viewfinder structured in a well-known manner to have a field of view that is substantially coextensive with that of the camera in order to enable the user to aim the camera and frame and compose the subject matter to be photographed.

Individual film units as shown by the top film unit 34 after being exposed to scene light by way of the objective taking lens 36 and trapezoidal mirror 40 in the manner of this invention are advanced from the camera in a well-known manner through a pair of juxtaposed film processing rollers 48 and an elongated film exit slot 46.

The photographic camera apparatus 10 additionally includes a low resolution photoresponsive detector 50 which preferably comprises 128×128 Charge Coupled Device (CCD) array 51 (see FIG. 2) with colored filter stripes or patches disposed on it so that red, green and blue intensities can be detected for each low resolution pixel element. The preferred pattern for the filter stripes is red, green, blue, green stripes thereafter repeating in the same sequence. Scene light is directed to the CCD array 51 by way of an objective lens 53 and a conventional shutter (not shown). The output from the photoresponsive detector 50 is directed to an electronic image processor 52 which operates in a manner to be subsequently described to process or enhance the electronic signal information derived from the photoresponsive detector 50. The electronic image processor 52, in turn, provides output signals to three linear arrays of color light exposing elements as shown at 54, 56 and 58. The linear arrays of color light exposing elements 54, 56, 58 preferably comprise, respectively, a row of 128 blue Light Emitting Diodes (LED's), a row of 128 green LED's and a row of 128 red LED's.

Figure 2:
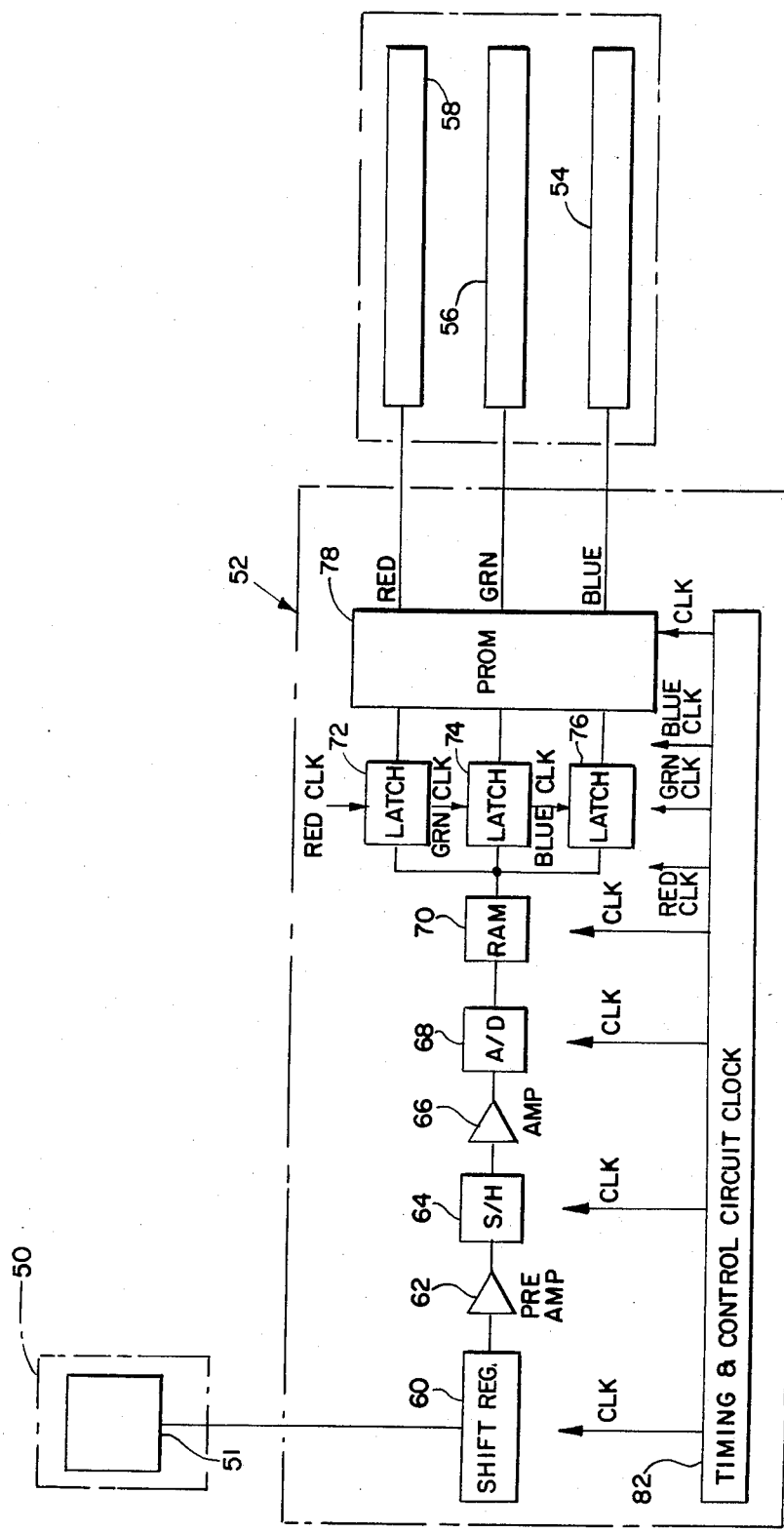
FIG. 2 is an electronic circuit diagram of the electronic image enhancing feature of this invention.

Referring now to FIG. 2, there is shown in greater detail the circuit details of the electronic image processor 52. The electronic signal data from the CCD array 51 is clocked to a shift register 60 by a timing and control circuit clock as shown generally at 82. The output signal from the shift register 60, in turn, is directed to a preamplifier 62 and then sampled and held in a sample and hold circuit 64. The signal is thereafter directed into an amplifier 66 and then converted from an analog signal to a digital signal by an A/D converter 68. The digital signal is thereafter clocked into successive locations in a random access memory (RAM) 70. The digitized data from the RAM 70 is thereafter directed by way of three latches 72, 74 and 76 to a programmable read only memory (PROM) 78 from which the data is thereafter directed to the linear arrays of color light exposing elements 54, 56 and 58.

Operation of the photographic camera apparatus of this invention proceeds in the following manner. The photographer commences a photographic exposure cycle in the usual manner by actuating a photographic cycle initiation button (not shown) on the camera 10 after framing and composing the desired scene to be photographed. Scene light is thereafter directed by the objective taking lens 36 along the optical axis $O_A$ through a shutter system (not shown) to the trapezoidal shaped mirror 40 from whence it is reflected to expose the topmost integral self-processable film unit 34. In all respects the aforementioned photographic exposure is conventional and well known to the art with the exception that the film unit 34 is exposed to an extent less than its selected optimum exposure value. Thus, the film unit 34 is deliberately underexposed relative to its selected optimum exposure value in the manner of this invention for reasons which will become apparent from the following discussion.

Simultaneously with the aforementioned photographic exposure, the photoresponsive detector 50 also electronically measures the scene light in low resolution for a selected exposure interval as determined by its shutter (not shown). The timing and control circuit clock 82 thereafter operates to clock the electronic image data for every color of the CCD array 51 into the shift register 60 whereafter for each horizontal line clocked into the shift register 60, the shift register clocks out each pixel. The charge packets from the shift register 60 are thereafter directed to the preamp 62 from whence they are sampled and held by the sample and hold circuit 64. The sampled signal is thereafter directed into the amplifier 66 and converted into a digital signal format by the analog to digital (A/D) converter 68. Each analog signal value for each pixel is preferably converted into a four bit digital signal value. The digital values are thereafter clocked by the timing and control circuit clock 82 into successive locations in the random access memory (RAM) 70. In this manner the signal content of the CCD array 51 is digitized and stored in a random access memory (RAM) 70. As is readily apparent, since the photoresponsive detector 50 has a 128×128 pixel resolution, the random access memory (RAM) 70 is required to hold four bits times 128 times 128 pixels equal to 65,536 bits of information.

The digitized electronic signal data stored in the RAM 70 is thereafter clocked out and used to control an electronic second exposure in the manner of this invention to be subsequently described. The digitized pixel image values for each horizontal line are stored in the RAM 70 in the pattern of the filter stripes: red, green, blue, green, etc. and are thereafter converted to three parallel lines of red, green and blue pixel signal data by replicating the measured image pixel data to estimate red, green and blue image signal values for every pixel of the CCD array in the following manner. The digitized image data is clocked out of the RAM 70 by the timing and control circuit clock 82 to the three different latches 72, 74 and 76 corresponding, respectively, to the red, green and blue image data. Since the filter pattern over the CCD array 51 is in the ordered sequence of red, green, blue, green stripes, it is readily apparent that the red pixel latch 72 is clocked once for every fourth system clock pulse, the green pixel latch 74 is clocked once for every other system clock pulse and the blue latch 76 is clocked once for every fourth system clock pulse. Each of the three latches 72, 74 and 76 holds its four bit digitized pixel value until the next succeeding clock pulse from the timing and control circuit clock 82 appears. In this manner, each latch holds the value of the most recent pixel occurring for that color in the currently processed line providing a simultaneous estimate of R, G and B for each pixel.

The digital pixel signal values are directed from the latch circuits 72, 74 and 76 into the programmable read only memory (PROM) which may include a look-up table containing the desired image processing information. Thus for each possible combination of red, green and blue values for each pixel there may be provided a selected exposure output control signal value chosen to compensate for an undesired film characteristic or to achieve a desired image processing effect. The red, green and blue output signal values from the PROM 78 are directed respectively to the red, green and blue linear arrays of color light exposing elements 58, 56 and 54 to additionally expose the previously exposed top film unit 34 as it is advanced from the photographic camera 10 in the usual manner by the juxtaposed film processing rollers 48.

Thus, the undesired film characteristics or unfavorable scene lighting conditions may be compensated or the desired image processing effect may be provided through this additional exposure. For example, colors may be made more saturated by adding more red exposure where the detector 50 measured red pixel data. In this example the programmable read only memory (PROM) 78 would receive 12 bits of digitized signal data for each pixel element sensed by the CCD array 51 and, in turn, provide 12 output bits of digitized signal data to drive corresponding light emitting diodes in the linear arrays 54, 56 and 58. Such digitized data may be utilized to drive the linear arrays in any well-known manner as disclosed in United Kingdom patent application No. 2,104,266, by Donald T. Dolan et al., published Mar. 2, 1983 and now incorporated by reference herein.

Thus, in this manner, the electronic image processor 52 in conjunction with the photoresponsive detector 50 provides a means for sensing the scene light from the scene to be photographed during the actual photographic exposure so as to convert the sensed scene light to electrical signal information corresponding to the sensed scene light. The linear arrays of color light exposing elements 54, 56 and 58, in turn, provide a means responsive to the electrical signal information to expose the photosensitive material to an extent which in conjunction with the direct exposure to scene light substantially provides a select optimum exposure value.

As will be readily understood, the PROM 78 may apply an exposure transform to the inputted R,G,B signal values in accordance with the following matrix wherein R, G, and B represent the red, green and blue digitized signal values input to the PROM 78 from the latches 72, 74 and 76, respectively, wherein R', G' and B' represent the corresponding red, green and blue transform digitized signal values output from the PROM 78 and wherein δ may typically be in the order of 0.25.

$$\begin{bmatrix} R \\ G \\ B \end{bmatrix} \begin{bmatrix} 2\delta & -\delta & -\delta \\ -\delta & 2\delta & -\delta \\ -\delta & -\delta & 2\delta \end{bmatrix} = \begin{bmatrix} R' \\ G' \\ B' \end{bmatrix}$$

In those situations where R', G' or B' may have negative values, such negative values are set to zero since a negative exposure cannot be physically achieved. The aforementioned matrix may be derived from a well-known matrix transformation by subtracting therefrom the exposure values provided optically by the photographic exposure through the objective lens as follows.

$$\begin{bmatrix} 1+2\delta & -\delta & -\delta \\ -\delta & 1+2\delta & -\delta \\ -\delta & -\delta & 1+2\delta \end{bmatrix} - \begin{bmatrix} 1 & 0 & 0 \\ 0 & 1 & 0 \\ 0 & 0 & 1 \end{bmatrix} = \begin{bmatrix} 2\delta & -\delta & -\delta \\ -\delta & 2\delta & -\delta \\ -\delta & -\delta & 2\delta \end{bmatrix}.$$

In the aforementioned example, the exposure values provided optically are shown by way of example to be 1 although as is readily apparent such exposure values could also be less than 1.

Referring now to FIGS. 3 and 4, there is shown an alternate arrangement which replaces the linear arrays of color light exposing elements with red, green and blue lights shown respectively at 82, 84 and 86. The red, green and blue lights 82, 84 and 86 are each respectively optically connected to an appropriate light dispersing optical element as shown generally at 88 to provide a substantially uniform light throughout the exposure chamber 38. A liquid crystal array as shown generally at 90 is provided in overlying relationship with respect to the top film unit 34 so as to control the added exposure in the aforementioned manner.

As is readily apparent, the liquid crystal array 90 is controlled so as to be maximally transparent during the initial photographic exposure through the objective lens of the camera. FIG. 3 shows the addition of three buffer circuits 92, 94 and 96 to the red, green and blue output terminals respectively from the PROM 78 to enable the memory read-out process to occur consecutively starting with all the red pixel signal data modulating the LCD 90 while the red light 82 is turned on and thereafter switching to transfer all the green pixel signal data to the LCD 90 while the green light 84 is turned on and thereafter finally transferring all the blue pixel signal data to the LCD 90 while the blue light is turned on. Although two preferred means for providing the second or supplementary exposure to the film unit have been described, it will be understood and appreciated that any other means responsive to the electrical signal information may be utilized for exposing the photosensitive material to an extent which in conjunction with the direct optical exposure to scene light substantially provides the selected optimum exposure value. In addition, although a camera apparatus utilizing insant developing film has been shown and described, the scope of invention is by no means so limited and extends to camera systems utilizing conventional type film.

Thus, other embodiments of the invention, including additions, subtractions, deletions and other modifications of the preferred disclosed embodiments of the invention will be obvious to those skilled in the art and are within the scope of the following claims.

What is claimed is:

1. A photographic camera apparatus comprising:
   means for controlling the exposure of a photosensitive material to scene light received directly from a scene of which an image is to be recorded in a manner whereby the photosensitive material is exposed to an extent less than a selected optimum exposure value;
   means for sensing the scene light from the scene to be photographed during said photographic exposure and converting said sensed scene light to electrical signal information corresponding to said sensed scene light; and
   means responsive to said electrical signal information for exposing said photosensitive material to supplemental illumination which in conjunction with said direct exposure to scene light substantially provides the selected optimum exposure value.

2. The photographic camera of claim 1 wherein said scene light sensing means senses the scene light at a resolution substantially less than the resolution at which said photosensitive material is exposed during its direct exposure to scene light.

3. The photographic camera of claim 2 wherein said exposing means which is responsive to said electrical signal information comprises means for processing and thereby altering said electrical signal information so as to ultimately enhance the recorded image of the scene.

4. The photographic camera of claim 3 wherein said exposing means which is responsive to said electrical signal information comprises at least one array of light emitting elements situated in light exposing relationship to the photosensitive material.

5. The photographic camera of claim 4 wherein said scene light sensing means comprises a CCD array.

6. The photographic camera of claim 4 wherein said exposing means which is responsive to said electrical signal information comprises three arrays of color light emitting elements each array of which emits one of the three primary red, green or blue colors and said CCD array comprises colored filter elements thereon so that the three primary red, green and blue color intensities can be sensed.

7. The photographic camera of claim 6 wherein said photosensitive material is part of a self-developable film unit and there are included means for advancing and processing each of the film units subsequent to its direct exposure to scene light and wherein said exposing means which is responsive to said electrical signal information comprises at least one array of light emitting elements situated in light exposing relationship across the photosensitive material so as to expose succeeding lines across the photosensitive material as the film unit is advanced and processed.

8. The photographic camera of claim 7 wherein said scene light sensing means comprises a CCD array with colored filter elements thereon so that the three primary red, green and blue color intensities can be sensed and said exposing means which is responsive to said electrical signal information comprises three arrays of color light emitting elements each array of which emits one of the three primary red, green and blue colors, said three arrays being situated across the photosensitive material so as to expose succeeding lines across the photosensitive material as the film unit is advanced and processed.

9. The photographic camera of claim 3 wherein said exposing means which is responsive to said electrical signal information comprises a liquid crystal array in overlying relationship to the photosensitive material and means for providing generally uniform intensity light to the side of said liquid crystal array opposite to the photosensitive material.

10. The photographic camera of claim 3 wherein said scene light sensing means comprises a CCD array with colored filter elements thereon so that the three primary red, green, and blue color intensities can be sensed and said exposing means which is responsive to said electrical signal information comprises a liquid crystal array in overlying relationship to the photosensitive material and means for providing generally uniform intensity red, green or blue light to the side of said liquid crystal array opposite to the photosensitive material.

* * * * *